INVENTOR
HENRY H. WADE

Patented Aug. 25, 1936

2,052,431

UNITED STATES PATENT OFFICE 2,052,431

APPARATUS FOR CONCENTRATING ORES

Henry H. Wade, Hopkins, Minn.

Application February 26, 1934, Serial No. 712,907

8 Claims. (Cl. 209—455)

This invention relates to an improved apparatus for concentrating ores and other materials by a jigging action.

An object of the invention is to provide an apparatus for concentrating ores and other materials comprising a tank adapted to contain a liquid, usually water, and having a flexible tube or member mounted therein below the surface of the water and provided with means whereby it may be alternately inflated and deflated in rapid succession, to thereby impart a pulsating action to the water in the upper portion of said tank, whereby a jigging action is imparted to the material delivered thereto.

A further object is to provide an apparatus of the class described comprising a tank having a screen supported in the upper portion thereof and onto which the material to be treated is delivered, and said tank normally being filled with water to a level above the surface of said screen, and a flexible member or tube being horizontally disposed in the water in said tank, below the screen, and having a connection with a valve mechanism for controlling the flow of air to and from said flexible member, whereby said member may be alternately inflated and deflated to impart a pulsating action to the water, to thereby cause the latter to pulsate through said screen and thus impart a jigging action to the material passing thereover, whereby the various materials contained in the mass are separated according to their specific gravities, and means being provided for regulating the operation of said valve mechanishm, and also for controlling the flow of air to and from said flexible member, whereby the operation of the latter may be readily controlled to effect a thorough separation of all of the various materials contained in the mass of material delivered to the apparatus for treatment.

Other objects of the invention reside in the particular arrangement of the flexible tube or member within the tank; in the valve mechanism provided for controlling the flow of air to and from said member, to thereby cause it to alternately inflate and deflate; in the means whereby the supply of air to the flexible member may be increased while the flow of air therefrom to the atmosphere is decreased, and whereby the flexible member may be suddenly inflated while its deflation will be gradual; and, in the provision of such an apparatus, the operation of which may be controlled at will while the apparatus is in operation, whereby the separating action of the apparatus may be varied in accordance with the material delivered thereto without interrupting the operation of the apparatus.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 diagrammatically illustrates an apparatus for concentrating ores, embodying my invention;

Figures 1, 2, 3, 4, 5:
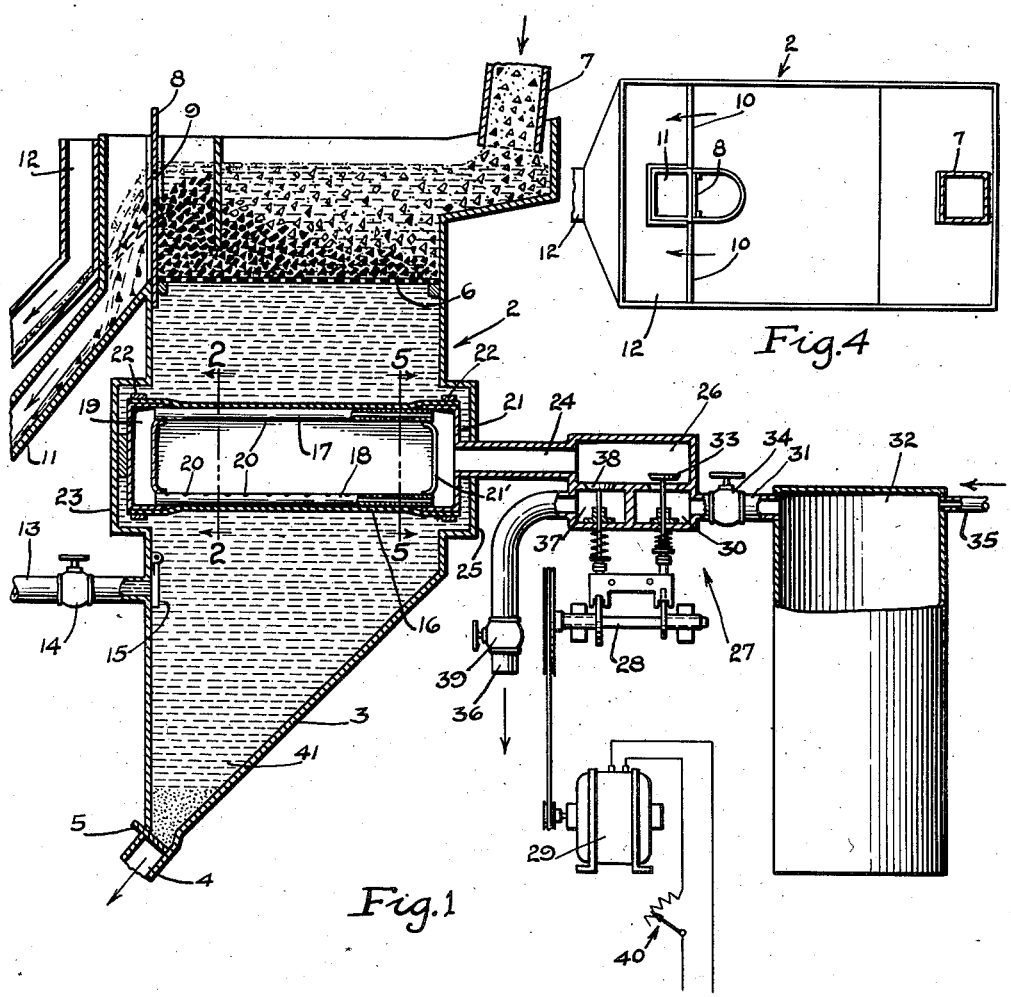
Figure 2 is an enlarged cross-sectional view on the line 2—2 of Figure 1, showing the flexible member or tube within the tank expanded.
Figure 3 is a similar view showing the flexible tube or member contracted or collapsed, as when the air is released therefrom.
Figure 4 is a diagrammatic plan view of the apparatus.
Figure 5 is a cross-sectional view on the line 5—5 of Figure 1, showing the liquid circulating passage provided in one of the heads of the flexible member.

In the selected embodiment of the invention here shown, there is illustrated in Figure 1, for purposes of disclosure, an apparatus comprising a tank 2 having a hopper bottom 3 terminating in a discharge spout 4, shown provided with a suitable gate valve 5.

A suitable screen 6 is shown mounted in the upper portion of the tank 2 and onto this screen the material to be treated is delivered from a feed spout 7, leading from a suitable source of supply. Water is also delivered into the tank 2 from the spout 7, as is customary in apparatus of this general character. A gate 8 is provided at the discharge end of the tank 2 above the screen 6. This gate is vertically adjustable and is shown having a discharge opening 9 through which the coarse high gravity material, commonly known as coarse concentrate, discharges into a suitable receiving spout 11 in the usual manner. The low gravity material contained in the mass is carried over the rear wall 10 of the tank with the water which overflows this wall, as indicated by the arrows in Figure 4, and is discharged into a receiving spout 12. This material is usually known as tailings, if it happens to be a waste product, or as middlings, if its quality is of such a nature as to warrant retreating it.

Additional water may be supplied to the tank 2 from a pipe 13 provided with a suitable valve 14. A flapper valve 15 is mounted within the tank 2 and acts as a check valve and allows water to flow from pipe 13 into tank 2, but prevents water in the tank from flowing back into pipe 13.

An important feature of this invention resides in the means provided for imparting a jigging or pulsating action to the water in the upper portion of the tank, whereby the water will pulsate through the screen 6 and thereby impart a jigging action to the material passing thereover to cause it to quickly stratify.

Such means is here shown as comprising a flexible tube or member 16, which is supported upon a suitable supporting structure comprising spaced pipes 17 and 18, having their end portions secured in suitable heads 19 and 21. These heads are preferably formed of metal and are suitably secured to the terminals of the pipes 17 and 18 to thereby provide a unitary frame structure adapted to support the flexible tube 16. The ends of the tube 16 are shown secured to the heads 19 and 21 in leak-proof relation by suitable bands 22. The pipes 17 and 18 are provided with suitable apertures 20 to establish communication between the interiors thereof and the interior of the tube 16. A slot 21' is provided in the head 21 and establishes direct communication between the interior of the member 16 and the pipe 24.

The head 19 is shown secured to the wall 23 of the tank 2, which wall portion 23 may be slightly offset as shown in Figure 1. The opposite head 21 is secured to a supply pipe 24 which passes through the offset wall portion 25 of the tank 2, and has its opposite end communicating with an air chamber 26 of a suitable valve mechanism, generally indicated by the numeral 27, and which is adapted to be driven by an operating mechanism 28 from a suitable motor 29. An air supply pipe 31 connects an air supply tank 32 to the chamber 30 of the intake valve 33. A valve 34 is provided in the pipe 31 for controlling the flow of air from the tank 32 to the valve mechanism. Air may be supplied to the tank 32 from a suitable pipe 35 connected to a suitable source of air supply, under pressure, and which is not shown in the drawing.

An air discharge pipe 36 is connected to the valve chamber 37 of the exhaust valve 38, whereby when the exhaust valve 38 is opened, air under pressure in the chamber 26 will discharge through the open exhaust valve 38 into the chamber 37, from whence it will discharge to the atmosphere through the pipe 36. A suitable valve 39 is provided in the pipe 36 to regulate the flow of air from the flexible tube 16 to the atmosphere.

The valve mechanism 27, as hereinbefore stated, is driven from the motor 29, the speed of which may be varied by suitable means such, for example, as a rheostat, diagrammatically indicated at 40 in Figure 1.

In the operation of the apparatus, the motor 29 is started, whereby the valve mechanism is set into motion, which causes the valves 33 and 38 to alternately open and close. When the intake valve 33 is opened, compressed air from the chamber 32 enters the tube 16, whereby the latter is inflated or expanded substantially as shown in Figure 2. The intake valve 33 then closes, whereupon the exhaust valve 38 opens to thereby permit the air within the tube 16 to exhaust to the atmosphere through the pipe 36. If the valve 39 is wide open, the air within the flexible tube 16 will quickly exhaust to the air because of the pressure of the water against the walls thereof. As the valve mechanism continues in operation, the flexible tube 16 is alternately inflated and deflated in rapid succession, whereby a pulsating action is imparted to the water in the tank 2 which causes the water to pulsate up and down through the screen 6.

The ore or material feed is then started, and as the material is delivered onto the surface of the screen 6, the water pulsating therethrough will cause the ore to stratify, the high specific gravity material lowering to the bottom of the bed and the low specific gravity material rising to the top of the bed, as indicated in Figure 1. The fine high gravity ore passes through the screen 6 into the lower portion 41 of the tank 2, commonly known to the trade as the hutch compartment, from which it is drawn off through the valve 5, located at the bottom of the hopper 3. If the material thus passing through the screen into the hutch compartment 41 is of high grade, it is commonly known as hutch concentrate. If it is not of high grade, it is commonly known as hutch product.

The relatively coarser high gravity material, which cannot pass through the screen 6, is discharged from the upper portion of the tank through the discharge opening 9 in the vertically adjustable gate 8. This relatively coarser high gravity material is commonly known as the coarse concentrate. The low gravity material which rises to the top of the bed on the screen 6, overflows the rear wall 10 of the upper portion of the tank, as hereinbefore stated, and discharges into the spout 12.

It will be noted that when the tube 16 is inflated or expanded, by the admission of air thereinto, water in the tank 2 is displaced, and as the water cannot escape from the lower portion of the tank, it is forced upwardly through the screen 6. Conversely, when the tube 16 is deflated, as when the exhaust valve 38 is opened, the pressure of the water against the walls thereof will cause it to collapse, as shown in Figure 3, whereby water in the upper portion of the tank will flow downwardly through the screen 6. To afford a clearer explanation of the operation of the tube 16, the inflation thereof will hereinafter be referred to as the pulsion stroke, and the deflation thereof, the suction stroke.

As a result of the novel construction of the means herein disclosed for imparting a pulsating action to the water in the tank 2, the desired jigging action may be imparted to the material traveling over the screen. This is brought about because of the universal adjustment of the apparatus, whereby the number of pulsion and suction strokes per minute may be varied, and whereby the type of stroke and the intensity thereof can easily be regulated while the apparatus is in motion. The best conditions for specific gravity separation can be obtained easily, by properly adjusting the operation of the flexible tube 16. The apparatus may be operated at high speed without mechanical difficulties, such as are commonly experienced with other types of apparatus now in common use. Another advantage in the use of the flexible tube or member 16 is that the operation of the apparatus may be completely interrupted, while fully loaded, and then started again without loss of time, as a long stroke may be used for a short time to loosen the locked particles of the material. It has also been found in actual practice, that preliminary close sizing of the ore before it is delivered onto the screen of the apparatus is unnecessary, as the apparatus is designed to separate the ore particles according to their specific gravities, and will operate effectively even though a wide range of sizes of particles may be present in the material treated.

To obtain efficient specific gravity separation of the various particles contained in the mass, it is necessary to obtain the right kind of stroke to effect rapid stratification of the low and high gravity particles. The exact nature of the best type of stroke for such separation may be difficult to predetermine, but may readily and quickly be determined by trial because of the convenient accessibility of all controls. The following describes, in a general way, the conditions which have been found to be desirable for the treatment of certain types or kinds of iron ore.

If the cycle of a jig operation is considered as consisting of a pulsion and a suction stroke, the separation of particles at the beginning of the pulsion stroke is according to the weights of the particles, and the lighter particles are forced higher up in the bed than the heavier particles. Toward the end of the pulsion stroke, there is a tendency toward specific gravity separation. Immediately following the pulsion stroke, there is an instant when the rising particles are about to begin to fall, that the separation is according to specific gravities. To take full advantage of this, there should be a settling period at the end of the pulsion stroke. This is to insure the settlement of the high gravity particles ahead of the low gravity particles before the suction stroke starts.

At the beginning of this latter stroke, the fine particles are drawn down faster than the heavier particles. Without this settling period following the end of the pulsion stroke, the high and low gravity fines would be drawn downward in a mass with a tendency to compact the bed by interlocking with the coarser ore. By means of the specific gravity separation and the settling period at the end of the pulsion stroke, the high gravity fines descend ahead of low gravity fines and compacting of the bed is minimized. During the latter part of the suction stroke, the coarse particles settle faster than the fine particles, but with proper control of the suction stroke, the high gravity fines descend ahead of the coarse particles and are drawn through the screen. The suction stroke should not be so strong that it will draw low gravity fines through the jig screen 6. The suction stroke should be followed by the pulsion stroke of the next cycle with no delay, so as to save time.

As most of the specific gravity separation comes at the end of the pulsion stroke, it is necessary for rapid jigging to have as many strokes per minute as possible. This requires the use of short strokes, as the shorter the stroke the more strokes per minute can be obtained. The strokes must be long enough to keep the bed mobile, that is, it must have sufficient fluidity so that the particles can separate without any appreciable friction. This fluidity is effected by the compacting of the bed as referred to above. By the use of the settling period at the end of the pulsion stroke, shorter, and consequently faster, strokes can be used.

The requirements for rapid jigging of the ore, therefore, are that the strokes be just long enough to keep the bed mobile; that the speed of the strokes be as fast as the length of stroke will permit; and, that there be a settling period at the end of each pulsion stroke.

The correct adjustments for accomplishing this can be arrived at for any particular ore, only by actual trial. For this reason, the apparatus should be so constructed that all adjustments might be easily and quickly made while the apparatus or jig is in operation, as the correct adjustments must be decided, in most instances, by the appearance of the coarse concentrate and of the hutch product. This feature of being able to make all necessary adjustments of the jig while it is in operation, is therefore of utmost importance.

The manner of making the necessary adjustments to effect the desired separation of the various ores contained in the mass will readily be understood by reference to the drawing, in which it will be noted that the number of strokes per minute may be varied by changing the speed of the motor by the rheostat 40. The length of the stroke, or in other words, the degree of expansion of the flexible tube 16, is adjusted by means of the control valve 34, which allows a large or small amount of air to enter the flexible tube, when the intake valve 33 is opened. The quickness of the pulsion stroke may be controlled by varying the speed of the intake valve 33 when opening, and the settlement period at the end of the pulsion stroke is regulated by adjusting the timing of the valve mechanism 27 so that the exhaust valve opens a certain period of time after the intake valve 33 closes.

While this device has been designed for use in concentrating ores and other materials, it may also be used as an agitator for keeping liquids in motion within a suitable container. While I have herein described the invention as being used in the treatment of iron ore, it is to be understood that it may be used for treating coal, gravel, and other materials, which may consist of particles of different specific gravities and are, therefore amenable to gravity concentration, without departing from the scope of the invention.

I claim as my invention:

1. In a jig for concentrating ores and similar materials, a tank adapted to receive a liquid therein and having a screen for the reception of the material, a fluid tight collapsible and expansible member positioned in operative relation to the fluid in said tank, and means for supplying and exhausting fluid to and from said member, to pulsate the liquid in said tank, said means including mechanism for varying the number of pulsations per unit of time, the amplitude of each pulsation, and the duration of the quiescent period at the end of each pulsion stroke, said mechanism being adjustable so that each of the variable elements of operation of said jig may be adjusted independently of the others.

2. In a jig for concentrating ores and similar materials, a tank adapted to receive a liquid therein and having a screen for the reception of the material, a fluid tight collapsible and expansible member positioned within said tank, and means for supplying and exhausting fluid to and from said member to pulsate the liquid in said tank, said means including mechanism adjustable while the jig is in operation for varying independently of each other the number of pulsations per unit of time, the amplitude of each pulsation, and the duration of the quiscent period at the end of each pulsion stroke.

3. In a jig for concentrating ores and similar materials, a tank adapted to receive a liquid therein and having a screen for the reception of the material, a fluid tight collapsible and expansible member positioned within said tank directly below said screen and in relatively close proximity thereto, and means for supplying and exhausting fluid to and from said member to pulsate the liquid above said member, said means including a source of fluid under pressure and a plurality of valves interposed between said source and said member, the operating means for said valves being adjustable to vary independently the number of pulsations per unit of time, the amplitude of each pulsation, and the duration of the quiescent period at the end of the pulsion stroke.

4. In a jig for concentrating ores and similar materials, a tank adapted to receive a liquid therein and having a screen for the reception of the material, a fluid tight collapsible and expansible member positioned within said tank beneath said screen and in relatively close proximity thereto, and means for supplying and exhausting fluid to and from said member to pulsate the liquid above said member, said means including a source of fluid under pressure and a mechanically actuated valve mechanism for alternately admitting fluid under pressure to said member and exhausting the pressure fluid from said member, and additional valve means for controlling the fluid from said source to said valve mechanism and the exhaust from said member.

5. In a jig for concentrating ores and similar materials, a tank adapted to receive a liquid therein and having a screen for the reception of the material, a fluid tight collapsible and expansible member positioned within said tank directly below said screen and in relatively close proximity thereto, and means for supplying and exhausting fluid to and from said member to pulsate the liquid above said member, said means including a source of fluid under pressure and a mechanically actuated valve mechanism for alternately admitting fluid under pressure to said member and exhausting the pressure fluid from said member, means for varying the operation of said mechanically actuated valve mechanism, and additional valve means for controlling the fluid from said source to said valve mechanism and the exhaust from said member.

6. In a jig for concentrating ores and similar materials, a tank adapted to receive a liquid therein and having a screen for the reception of the material, a fluid tight collapsible and expansible member positioned within said tank directly below said screen and in relatively close proximity thereto, and means for supplying and exhausting fluid to and from said member to pulsate the liquid above said member, said means including a source of fluid under pressure and a mechanically actuated valve mechanism for alternately admitting fluid under pressure to said member and exhausting the pressure fluid from said member, means for varying the operation of said mechanically actuated valve mechanism with respect to the timing of said valves and the speed of operation of said valves, manually operable valve means for controlling the supply of fluid from said source to said valve mechanism, and additional manually operable valve means for controlling the exhaust of fluid from said member.

7. In a jig for concentrating ores and similar materials, a tank adapted to receive a liquid therein and having a screen for the reception of the material, a fluid tight collapsible and expansible member positioned within said tank directly below said screen and in relatively close proximity thereto, and means for supplying and exhausting fluid to and from said member to pulsate the liquid above said member, said means including a source of fluid under pressure and a plurality of valves interposed between said source and said member, the operating means for said valves being adjustable to vary the duration of the quiescent period at the end of the pulsion stroke independently of the number of pulsations per unit of time.

8. In a jig for concentrating ores and similar materials, a tank adapted to receive a liquid therein and having a screen for the reception of the material, a fluid tight collapsible and expansible member positioned in operative relation to the fluid in said tank, and means supplying and exhausting fluid to and from said member to pulsate the liquid in said tank, said means including mechanism for varying independently of each other the number of pulsations per unit of time and the duration of the quiescent period at the end of each pulsion stroke.

HENRY H. WADE.